US011635224B2

(12) United States Patent
Kiryu et al.

(10) Patent No.: US 11,635,224 B2
(45) Date of Patent: Apr. 25, 2023

(54) OPERATION SUPPORT SYSTEM, OPERATION SUPPORT METHOD, AND NON-TRANSITORY RECORDING MEDIUM

(71) Applicant: FUJI ELECTRIC CO., LTD., Kanagawa (JP)

(72) Inventors: Satoshi Kiryu, Tokyo (JP); Yoshio Tange, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 371 days.

(21) Appl. No.: 16/041,018

(22) Filed: Jul. 20, 2018

(65) Prior Publication Data

US 2019/0041082 A1   Feb. 7, 2019

(30) Foreign Application Priority Data

Aug. 4, 2017  (JP) .............................. JP2017-151967

(51) Int. Cl.
*F24F 11/65*   (2018.01)
*G05B 13/04*   (2006.01)
(Continued)

(52) U.S. Cl.
CPC .............. *F24F 11/65* (2018.01); *F24F 11/63* (2018.01); *G05B 13/041* (2013.01); *F24F 11/52* (2018.01);
(Continued)

(58) Field of Classification Search
CPC ........ F24F 11/65; F24F 11/63; F24F 2140/60; F24F 2110/10; F24F 11/52; G05B 13/041; Y04S 10/40
See application file for complete search history.

(56) References Cited

U.S. PATENT DOCUMENTS

2003/0009401 A1*  1/2003  Ellis ....................... G06Q 30/04
                                                                705/35
2005/0159935 A1*  7/2005  Orii ......................... G06F 30/00
                                                                703/2
(Continued)

FOREIGN PATENT DOCUMENTS

JP       2015102263 A   *  6/2015
JP         5761476            8/2015
(Continued)

OTHER PUBLICATIONS

Muchayi, M. (1999). Transmission consideration-based electricity rates using optimal power flows (Order No. NQ39324). Available from ProQuest Dissertations and Theses Professional. (304574914). Retrieved from http://dialog.proquest.com/professional/docview/304574914?accountid=161862 (Year: 1999).*

(Continued)

*Primary Examiner* — Patricia H Munson
*Assistant Examiner* — Nicholas D Bolen
(74) *Attorney, Agent, or Firm* — IPUSA, PLLC

(57) ABSTRACT

There is provision of an operation support system for supporting an operation of a demand-supply system including a resource supplying facility and a resource demander facility. The operation support system receives an input of a demand-supply system model of the demand-supply system, facility-capacity information of the resource supplying facility, and analysis condition information defining a plurality of variables and an external variable of the demand-supply system, to generate a correlation logical formula representing a relation among the plurality of variables and the external variable. The operation support system further acquires performance data of the demand-supply system which includes actual values of the plurality of variables and the external variable during an operation, and renders an area represented by the correlation logical formula when the (Continued)

external variable is equal to an actual data included in the performance data and a point represented by the performance data of the plurality of variables.

6 Claims, 13 Drawing Sheets

(51) Int. Cl.
  *F24F 11/63* (2018.01)
  *F24F 110/10* (2018.01)
  *F24F 140/60* (2018.01)
  *F24F 11/52* (2018.01)
(52) U.S. Cl.
  CPC ....... *F24F 2110/10* (2018.01); *F24F 2140/60* (2018.01); *Y04S 10/40* (2013.01)

(56) References Cited

U.S. PATENT DOCUMENTS

| | | | | |
|---|---|---|---|---|
| 2008/0027772 | A1* | 1/2008 | Gernega | G06Q 10/04 |
| | | | | 705/7.26 |
| 2008/0215174 | A1* | 9/2008 | Kanai | G06F 30/00 |
| | | | | 700/98 |
| 2009/0002370 | A1* | 1/2009 | Helfman | G06T 5/009 |
| | | | | 345/440 |
| 2012/0103395 | A1* | 5/2012 | Prengler | G06Q 10/06 |
| | | | | 136/248 |
| 2012/0150509 | A1* | 6/2012 | Shiel | F24D 19/1081 |
| | | | | 703/2 |
| 2013/0138396 | A1* | 5/2013 | Hauffen | G06F 17/00 |
| | | | | 702/184 |
| 2013/0161235 | A1* | 6/2013 | Foody | C01B 3/36 |
| | | | | 208/89 |
| 2013/0219349 | A1* | 8/2013 | Lee | G03F 1/36 |
| | | | | 716/53 |
| 2013/0304269 | A1* | 11/2013 | Shiel | G06Q 10/06 |
| | | | | 700/291 |
| 2014/0089234 | A1* | 3/2014 | Cacioppi | G06F 17/11 |
| | | | | 706/12 |
| 2014/0277769 | A1* | 9/2014 | Matsuoka | F24F 11/30 |
| | | | | 700/278 |
| 2018/0004173 | A1* | 1/2018 | Patel | G05B 13/048 |

FOREIGN PATENT DOCUMENTS

| | | |
|---|---|---|
| JP | 2016-166697 | 9/2016 |
| JP | 6065167 | 1/2017 |
| JP | 6142959 | 6/2017 |

OTHER PUBLICATIONS

Sun, Y. (2010). Online optimal control of multiple-chiller systems in large buildings (Order No. 3429793). Available from ProQuest Dissertations and Theses Professional. (761142738). Retrieved from https://dialog.proquest.com/professional/docview/761142738?accountid=161862 (Year: 2010).*

Japanese Office Action for Japanese Pat. Appln. No. 2017-151967 dated Nov. 14, 2017.

* cited by examiner

VERTICAL AXIS: TOTAL POWER CONSUMPTION P

HORIZONTAL AXIS: TOTAL LOAD L

EXTERNAL VARIABLE: OUTSIDE AIR TEMPERATURE T

F1: $=P=P_1+P_2+P_3+P_4 \wedge L=L_1+L_2+L_3+L_4$

OPERATION SUPPORT SYSTEM, OPERATION SUPPORT METHOD, AND NON-TRANSITORY RECORDING MEDIUM

CROSS-REFERENCE TO RELATED APPLICATION

This application is based upon and claims the benefit of priority of the prior Japanese Patent Application No. 2017-151967, filed on Aug. 4, 2017, the entire contents of which are incorporated herein by reference.

BACKGROUND OF THE INVENTION

1. Field of the Invention

The present invention relates to an operation support system, and an operation support method.

2. Description of the Related Art

In a system including multiple facilities for generating or supplying a resource (such as steam or cold energy), a method is known for determining an amount of resource to be generated (or supplied) by each of the multiple facilities such that consumed costs (such as gas, heavy oil, or electric power) are optimized, depending on demand for the resource by facilities for consuming the resource.

Further, with respect to an air-conditioning system, a technique is known for visualizing a relation between a possible range of total power consumption of heat source equipment constituting an air-conditioning system and a possible range of a total load of the air-conditioning system (which may be referred to as a feasible region or an executable area), based on a range of an outside air temperature, a characteristic of the heat source equipment, and the like (see Patent Document 1, for example).

However, in the technique disclosed in Patent Document 1, in order to visualize an executable area, a range of an external condition, such as an outside air temperature, was required to be determined in advance. Accordingly, in some cases, it was not possible to determine to what extent a current operating method of a system is deviating from an optimal operating method, under an actual external condition identified during operation of a system (e.g. by using actual performance data of an external condition).

An object in one aspect of the embodiments is to visualize an executable area in accordance with an actual value of an external condition.

RELATED-ART DOCUMENTS

Patent Document

[Patent Document 1] Japanese Patent No. 6065167

SUMMARY OF THE INVENTION

According to one embodiment, an operation support system for supporting an operation of a demand-supply system is provided. The demand-supply system includes a resource supplying facility configured to supply a resource, and a resource demander facility configured to demand the resource supplied from the resource supplying facility. The operation support system includes: an input unit configured to receive an input of a demand-supply system model of the demand-supply system, facility-capacity information representing a facility capacity of the resource supplying facility, and analysis condition information defining a plurality of variables to be analyzed with respect to the demand-supply system model and the facility-capacity information and defining an external variable representing an external condition of the demand-supply system model; a logical formula generating unit configured to generate a correlation logical formula representing a relation among the plurality of variables and the external variable, based on the demand-supply system model, the facility-capacity information, and the analysis condition information received by the input unit; an acquisition unit configured to acquire, from a measurement apparatus measuring the demand-supply system, performance data including actual values of the plurality of variables and an actual value of the external variable during an operation of the demand-supply system; and a visualizing unit configured to render an area represented by the correlation logical formula in a case in which the external variable is equal to the actual value of the external variable included in the performance data, and to render a point represented by the performance data of the plurality of variables, based on the performance data acquired by the acquisition unit and the correlation logical formula generated by the logical formula generating unit.

According to one aspect of the embodiments, it is possible to visualize an executable area in accordance with an actual value of an external condition.

BRIEF DESCRIPTION OF THE DRAWINGS

FIG. 8 is a diagram illustrating an example of analysis condition information;

FIG. 9 is a diagram illustrating an example of a first formula set;

FIG. 10 is a diagram illustrating an example of a second formula set;

DETAILED DESCRIPTION OF THE PREFERRED EMBODIMENTS

In the following, embodiments of the present invention will be described in detail with reference to the accompanying drawings.

<Overall Configuration>

Figure 1:
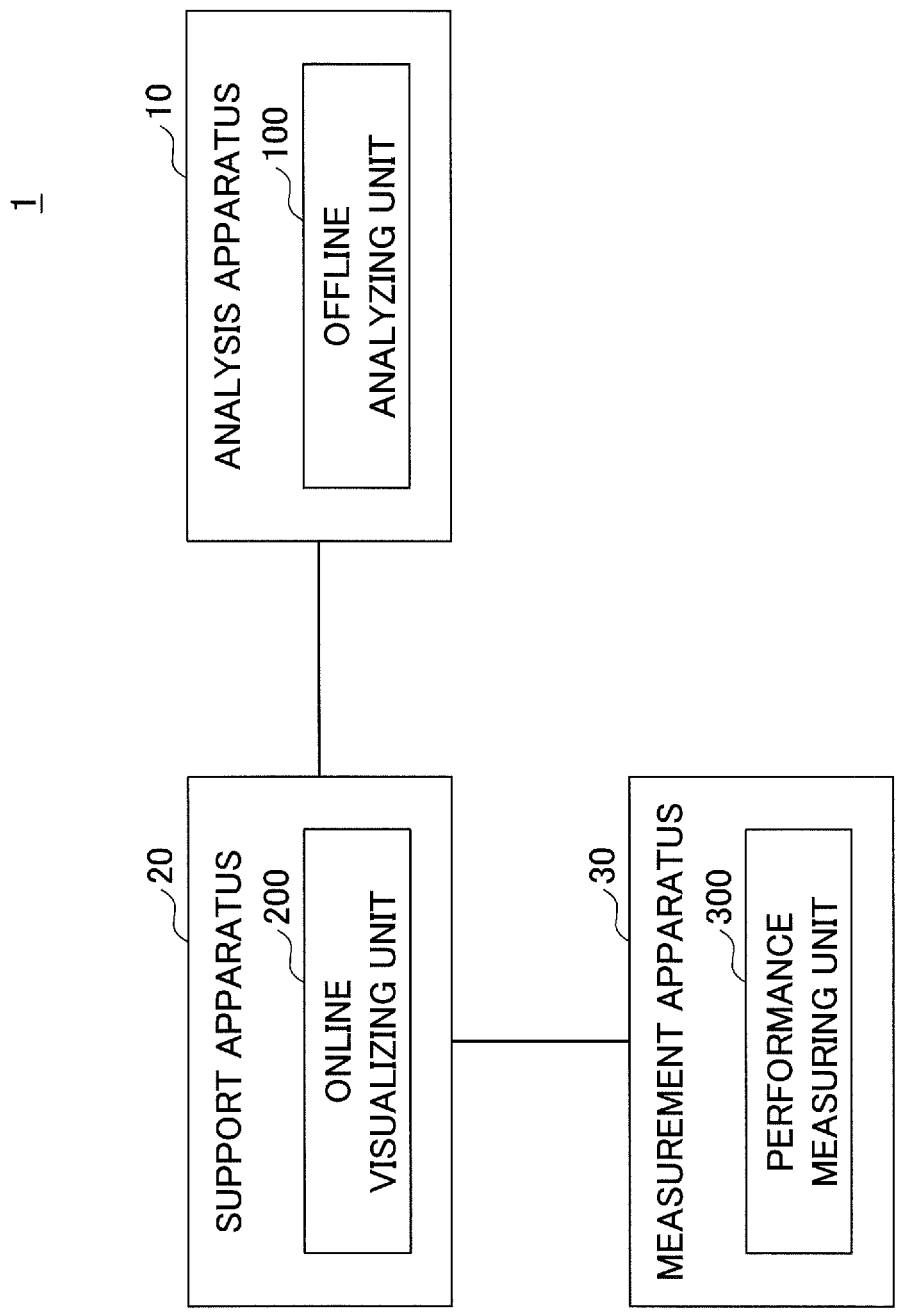
FIG. 1 is a block diagram illustrating an example of an overall configuration of an operation support system according to a present embodiment.

First, a system configuration of an operation support system 1 according to a present embodiment will be described with reference to FIG. 1. FIG. 1 is a block diagram illustrating an example of an overall configuration of the operation support system 1 according to the present embodiment.

As illustrated in FIG. 1, the operation support system 1 according to the present embodiment includes an analysis apparatus 10, a support apparatus 20, and a measurement apparatus 30, and supports consideration of an efficient operation of a demand-supply system. Here, the demand-supply system is a system that includes a resource supplying facility that generates and supplies resources, and a resource demander facility that demands the resource supplied from the resource supplying facility. Note that the demand-supply system may include a supply path for supplying the resource from the resource supplying facility to the resource demander facility.

A specific example of the demand-supply system includes an air-conditioning system that includes a heat source facility (an example of a resource supplying facility) that consumes "electrical power" to produce and supply "cold energy", and an air-conditioning target facility (an example of a resource demander facility) that demands the "cold energy". A specific example of the demand-supply system also includes an electric power system that includes a steam generating facility (another example of the resource supplying facility) that consumes "gas" to produce and supply "steam", a steam using facility (another example of the resource demander facility) that demands the "steam" and produces electric power or the like.

In the following, a case in which the demand-supply system is an air-conditioning system will be described. However, the present embodiment can be applied not only to an air-conditioning system but also to various types of demand-supply systems, such as the above mentioned electric power system.

The analysis apparatus 10 is, for example, an information processing apparatus such as a computer. The analysis apparatus 10 includes an offline analyzing unit 100. The offline analyzing unit 100 analyses, for example, a relation among a total thermal load (total load) demanded by the demand-supply system (total load), a sum of electric power (total power consumption) consumed by the demand-supply system, and an outside air temperature which is an external condition with respect to the demand-supply system.

The support apparatus 20 is, for example, an information processing apparatus such as a computer. The support apparatus 20 includes an online visualizing unit 200. The online visualizing unit 200 visualizes a feasible region (may also be referred to as an executable area) of the demand-supply system and an actual point of the demand-supply system, based on the relation analyzed by the offline analyzing unit 100 and actual data of the demand-supply system. The executable area represents a possible range of a total load and a possible range of total power consumption under a certain external condition. The actual point corresponds to coordinates indicating an actual value of a total load and an actual value of total power consumption.

By visualizing the executable area and the actual value, a user, such as a person in charge of an operation of the demand-supply system, can plan an efficient operation of the demand-supply system. That is, the person in charge can consider a method of operation that minimizes total power consumption of the demand-supply system while maintaining a total load demanded by the demand-supply system.

Note that the analysis apparatus 10 may be connected to the support apparatus 20 directly via a cable, or may be connected to the support apparatus 20 via a network or the like.

The measurement apparatus 30 is, for example, a PLC (Programmable Logic Controller) or an embedded device. The measurement apparatus 30 includes a performance measuring unit 300. The performance measuring unit 300 measures actual values (an actual value of a total load, an actual value of total power consumption, and an actual value of an outside air temperature) of the demand-supply system at each time, and generates performance data.

The configuration of the operation support system 1 illustrated in FIG. 1 is merely an example, and other configurations may be adopted. For example, the analysis apparatus 10 and the support apparatus 20 may be configured as a single apparatus.

<Outline of Method>

Figure 2:
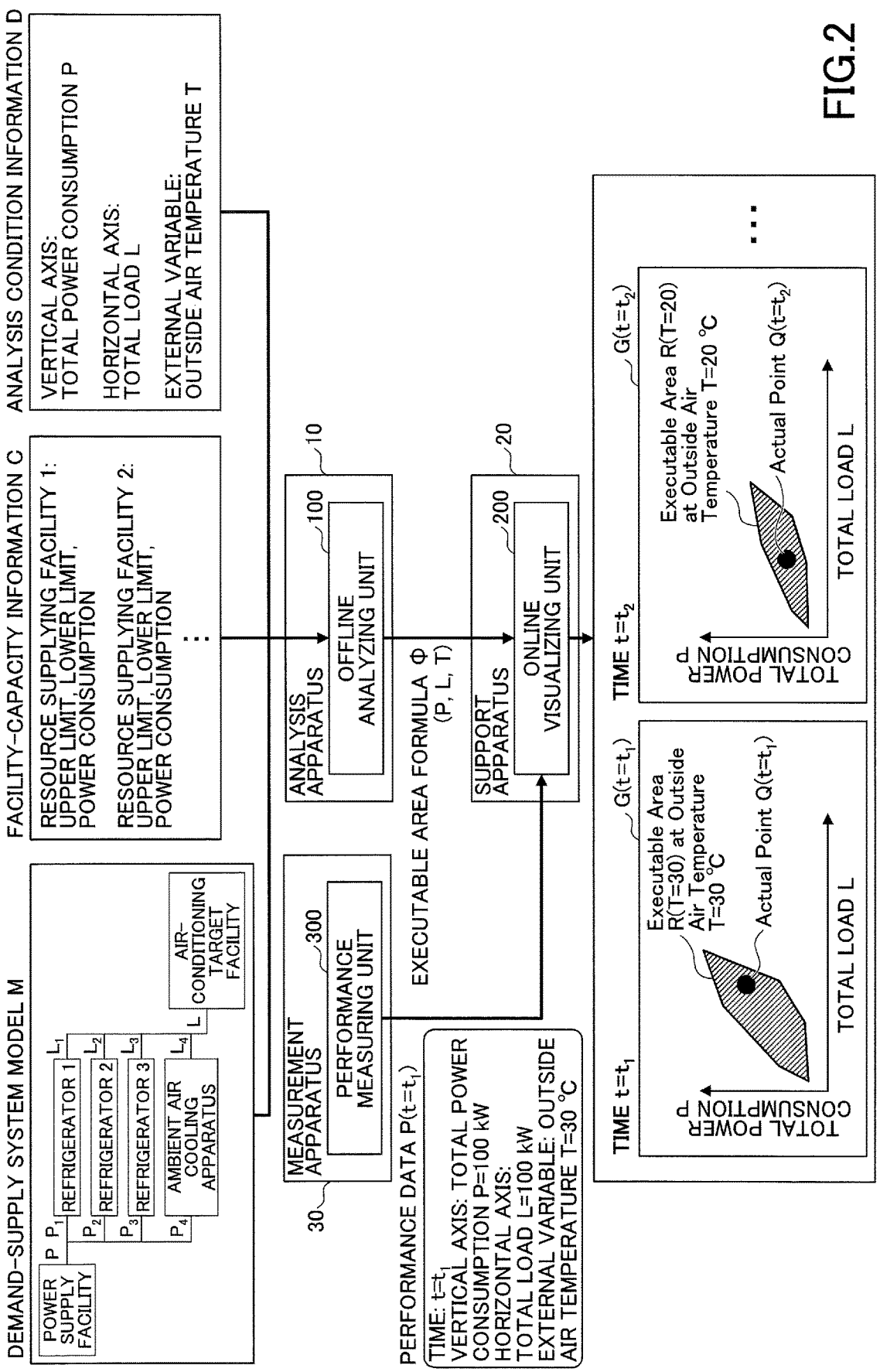
FIG. 2 is a schematic diagram illustrating an outline of a method of planning an efficient operation of a demand-supply system by using the operation support system according to the present embodiment.

Here, a method of planning an efficient operation of a demand-supply system by the operation support system 1 according to the present embodiment will be described, with reference to FIG. 2. FIG. 2 is a schematic diagram illustrating an outline of a method of planning an efficient operation of a demand-supply system by using the operation support system 1.

As illustrated in FIG. 2, a demand-supply system model M, facility-capacity information C, and analysis condition information D are entered to the offline analyzing unit 100.

The demand-supply system model M is information obtained by modeling a system configuration of the demand-supply system. The facility-capacity information C is information that represents an applicable facility range (which may also be referred to as a facility capacity) of resource supplying facilities and the like included in the demand-supply system. The analysis condition information D defines variables (that is, variables to be analyzed) corresponding to a horizontal axis and a vertical axis of a coordinate system of an executable area to be rendered, and a variable representing an external condition with respect to the demand-supply system (hereinafter referred to as an "external variable").

Note that in the following description, a case is described in which the variable of the vertical axis is a "total power consumption P", the variable of the horizontal axis is a "total load L", and the external variable is an "outside air temperature T".

The offline analyzing unit 100 generates an executable area formula $\Phi$ (P, L, T) based on the input information, that is, the demand-supply system model M, the facility-capacity information C, and the analysis condition information D. The executable area formula $\Phi(P, L, T)$ is a formula representing, as a logical formula, a relation among the total power consumption P, the total load L, and the outside air temperature T.

The online visualizing unit 200 acquires performance data P(t) at time t generated (measured) by the performance measuring unit 300. After acquiring the performance data P(t), based on the performance data P(t) and the executable area formula $\Phi(P, L, T)$, the online visualizing unit 200 displays a graph G(t) including an executable area R(T), when an outside air temperature at time t is T, and an actual point Q(t) at time t.

For example, in a case in which a value T of an outside air temperature included in the performance data $P(t=t_1)$ is 30 degrees Celsius, the online visualizing unit 200 renders the executable area R(T=30) based on the executable area formula $\Phi(P, L, T=30)$. The online visualizing unit 200 also renders the actual point $Q(t=t_1)$ on the executable area $R(T=30)$. The actual point $Q(t=t_1)$ is a point (coordinates) representing actual values of the total power consumption P and the total load L included in the performance data $P(t=t_1)$. By performing the above rendering operation, the graph $G(t=t_1)$, in which the executable area $R(T=30)$ and the actual point $Q(t=t_1)$ on the executable area $R(T=30)$ are drawn, is displayed.

Similarly, in a case in which a value T of an outside air temperature included in the performance data $P(t=t_2)$ is 20 degrees Celsius, the online visualizing unit 200 renders the executable area $R(T=20)$ based on the executable area formula $\Phi(P, L, T=20)$. The online visualizing unit 200 also renders the actual point $Q(t=t_2)$ on the executable area $R(T=20)$. The actual point $Q(t=t_2)$ is a point representing actual values of the total power consumption P and the total load L included in the performance data $P(t=t_2)$. By performing the above rendering operation, the graph $G(t=t_2)$, in which the executable area $R(T=20)$ and the actual point $Q(t=t_2)$ on the executable area $R(T=20)$ are drawn, is displayed.

As described above, the operation support system 1 according to the present embodiment displays the graph $G(t)$ including the executable area $R(T)$ corresponding to the outside air temperature T at each time t. In other words, the operation support system 1 according to the present embodiment dynamically displays the graph $G(t)$ including the executable area $R(T)$ representing a possible range of each of the total load L and the total power consumption P under the current operating condition of the demand-supply system, in accordance with an actual value of the outside air temperature T at each time t. Accordingly, a user, such as a person in charge of an operation of the demand-supply system, can plan an efficient operation of the demand-supply system based on an actual operating status, by referring to the executable area R and the actual point Q.

Note that a variable of the vertical axis, a variable of the horizontal axis, and an external variable which are included in the analysis condition information D are not limited to the "total power consumption", the "total load", and the "outside air temperature", respectively. For example, a "total cost", a "total amount of emitted $CO_2$", a "consumed cost of a specific resource supplying facility", an "amount of demand of a specific resource demander facility" may be defined as variables of the horizontal axis or vertical axis.

<Hardware Configuration>

Figure 3:
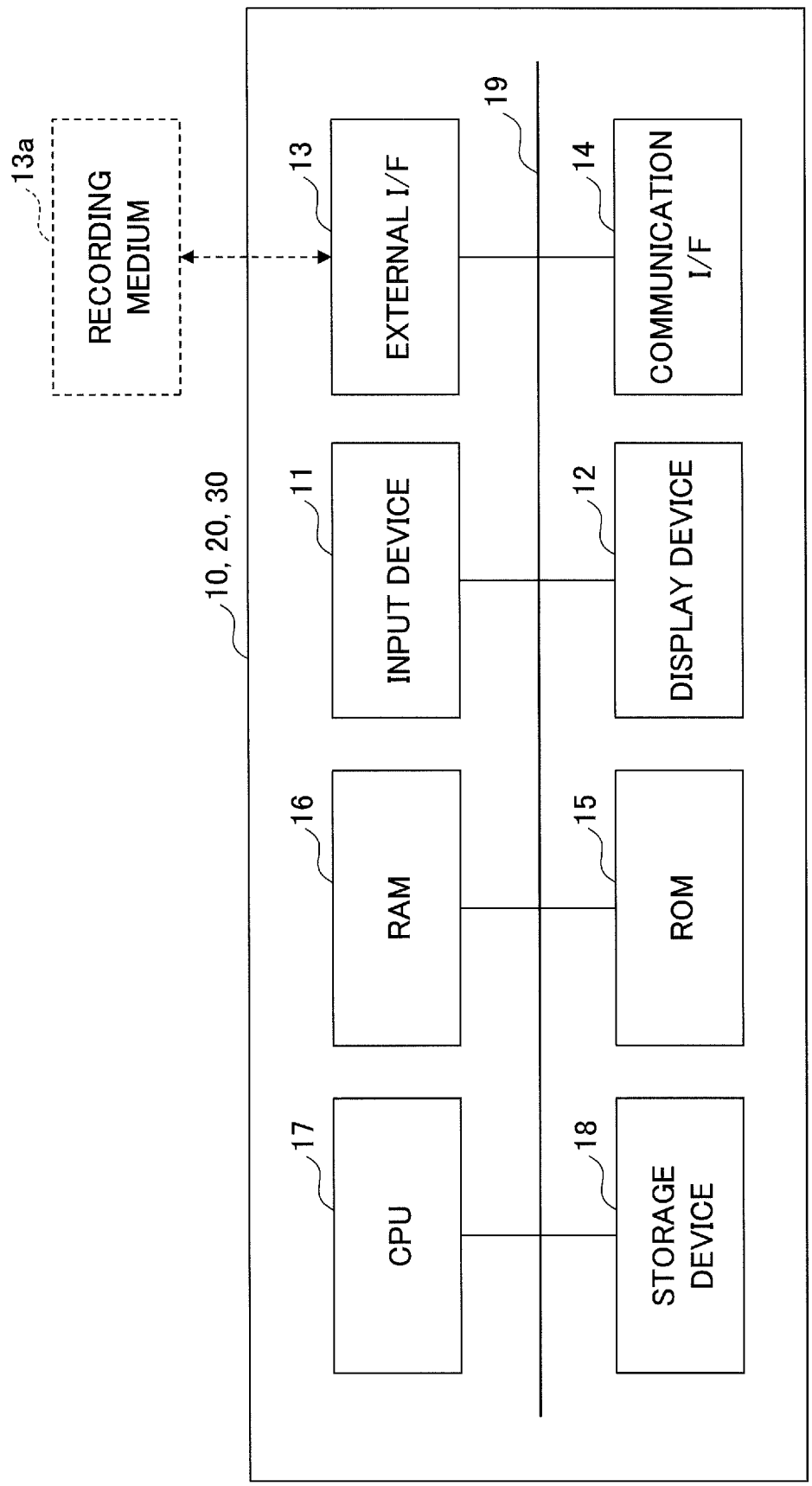
FIG. 3 is a block diagram illustrating an example of the hardware configuration of an analysis apparatus, a support apparatus, or a measurement apparatus according to the present embodiment.

Next, a hardware configuration of the analysis apparatus 10, the support apparatus 20, and the measurement apparatus 30 according to the present embodiment will be described with reference to FIG. 3. FIG. 3 is a block diagram illustrating an example of the hardware configuration of the analysis apparatus 10, the support apparatus 20, or the measurement apparatus 30 according to the present embodiment. Because the analysis apparatus 10, the support apparatus 20, and the measurement apparatus 30 have similar hardware configurations, the hardware configuration of the analysis apparatus 10 will be mainly described here.

As illustrated in FIG. 3, the analysis apparatus 10 according to the present embodiment includes an input device 11, a display device 12, an external I/F 13, a communication I/F 14, a ROM (Read Only Memory) 15, a RAM (Random Access Memory) 16, a CPU (Central Processing Unit) 17, and a storage device 18. These hardware elements are communicably coupled with each other via a bus 19.

Examples of the input device 11 include various buttons, a touch panel, a keyboard, and a mouse. The input device 11 is used for inputting various operating instructions to the analysis apparatus 10. The display device 12 includes a display and the like, and displays various processing results by the analysis apparatus 10. Note that the analysis apparatus 10 and the measurement apparatus 30 are not required to have either the input device 11 or the display device 12.

The external I/F 13 is an interface with an external device. An example of the external device includes a recording medium 13a. The analysis apparatus 10 can perform read or write operation of the recording medium 13a through the external I/F 13. Examples of the recording medium 13a include an SD memory card, a USB memory, a CD (Compact Disk), and a DVD (Digital Versatile Disk).

The communication I/F 14 is an interface for the analysis apparatus 10 to perform data communication with other apparatuses such as the support apparatus 20.

The ROM 15 is a non-volatile semiconductor memory that can retain data even when a power is turned off. The RAM 16 is a volatile semiconductor memory that temporarily stores a program or data. The CPU 17 is a processing device performing various processes by loading a program or data from the ROM 15 or the storage device 18, for example, onto the RAM 16.

The storage device 18 is a non-volatile memory device such as an HDD (Hard Disk Drive) or an SSD (Solid State Drive), for storing a program or data. Examples of the program or data stored in the storage device 18 include a program embodying the present embodiment, an OS (Operating System), which is basic software, and various application programs that run on the OS.

Because the analysis apparatus 10, the support apparatus 20, and the measurement apparatus 30 according to the present embodiment have the hardware configuration as illustrated in FIG. 3, the analysis apparatus 10, the support apparatus 20, and the measurement apparatus 30 can embody various processes to be described below.

<Functional Configuration>

Figure 4:
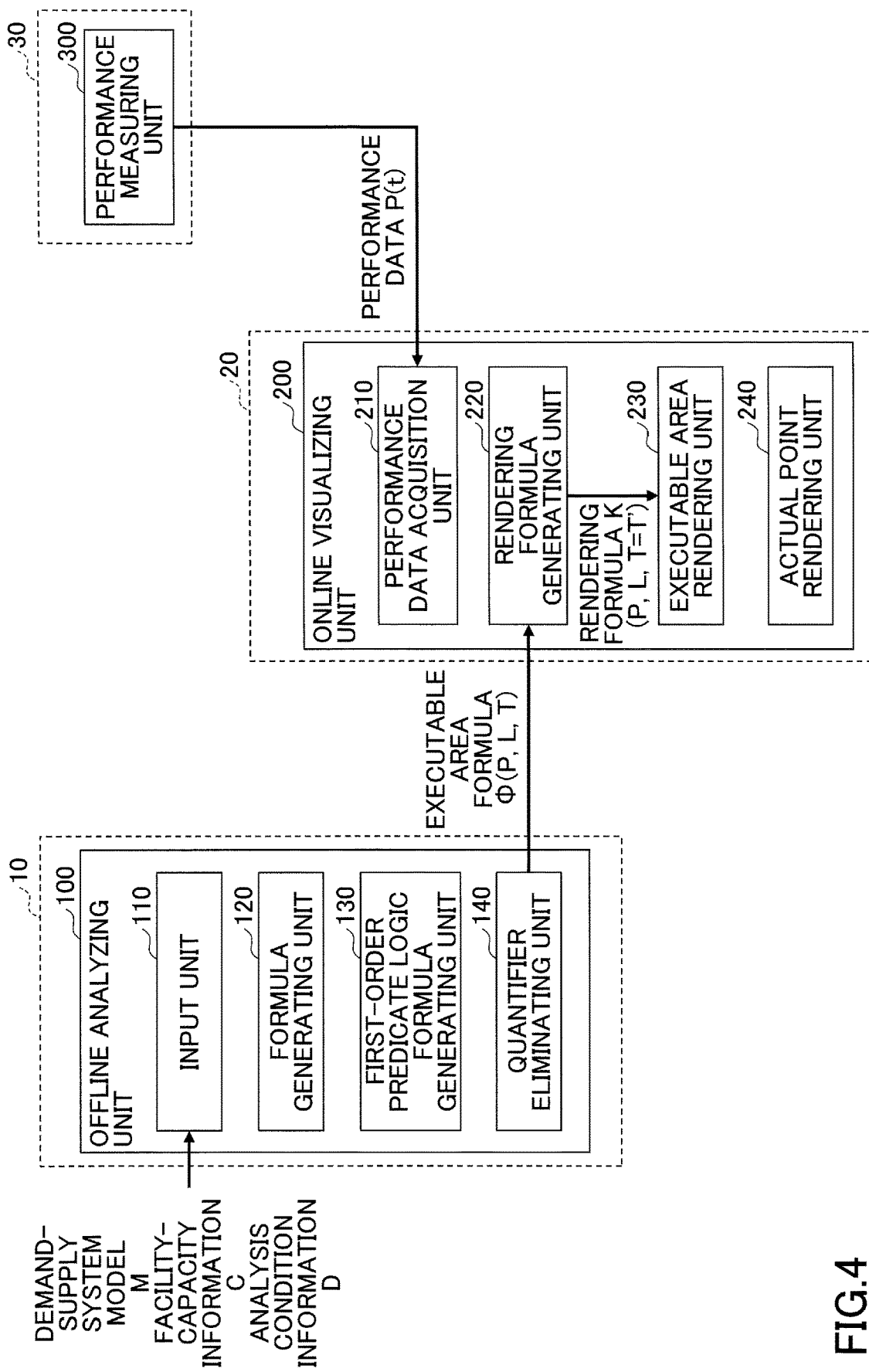
FIG. 4 is a block diagram illustrating an example of a functional configuration of the operation support system according to the present embodiment.

Next, a functional configuration of the operation support system 1 according to the present embodiment will be described with reference to FIG. 4. FIG. 4 is a block diagram illustrating an example of the functional configuration of the operation support system 1 according to the present embodiment.

As illustrated in FIG. 4, the offline analyzing unit 100 in the analysis apparatus 10 according to the present embodiment includes an input unit 110, a formula generating unit 120, a first-order predicate logic formula generating unit 130, and a quantifier eliminating unit 140. The offline analyzing unit 100 is embodied by the CPU 17 executing at least one program installed in the analysis apparatus 10.

The demand-supply system model M, the facility-capacity information C, and the analysis condition information D are entered to the input unit 110.

The formula generating unit 120 generates a first formula set and a second formula set based on the demand-supply system model M and the facility-capacity information C entered to the input unit 110. The first formula set is a set (group) of formula(s) that define a target variable in an optimization problem, a flow of energy (such as electric power or thermal load) in the demand-supply system model M, and the like. The second formula set is a set (group) of formula(s) representing a facility capacity, which defines a characteristic (such as a relation between power consumption and produced cold energy, or an upper limit of producible cold energy) of each facility in the demand-supply system.

The first-order predicate logic formula generating unit 130 generates a first-order predicate logic formula based on the first formula set and the second formula set generated by the formula generating unit 120, and based on the analysis condition information D entered to the input unit 110.

Using a quantifier elimination method, the quantifier eliminating unit 140 generates a correlation logical formula (executable area formula $\Phi(P, L, T)$) that expresses, by using a logical expression, a relation among the total load L, the total power consumption P, and the outside air temperature T, based on the first-order predicate logic formula generated by the first-order predicate logic formula generating unit 130. The executable area formula $\Phi(P, L, T)$ generated by the quantifier eliminating unit 140 is transmitted to the online visualizing unit 200 in the support apparatus 20.

Note that the executable area formula $\Phi(P, L, T)$ may be recorded into the recording medium 13a or the like. In this case, the online visualizing unit 200 in the support apparatus 20 may read the executable area formula $\Phi(P, L, T)$ stored in the recording medium 13a or the like.

As illustrated in FIG. 4, the online visualizing unit 200 in the support apparatus 20 according to the present embodiment includes a performance data acquisition unit 210, a rendering formula generating unit 220, an executable area rendering unit 230, and an actual point rendering unit 240. The online visualizing unit 200 is embodied by the CPU 17 executing at least one program installed in the support apparatus 20.

For each time t, the performance data acquisition unit 210 acquires performance data P(t) generated by the performance measuring unit 300 in the measurement apparatus 30. To acquire performance data P(t), the performance data acquisition unit 210 may receive performance data P(t) transmitted from the performance measuring unit 300, or may issue a request for acquiring performance data P(t) to the performance measuring unit 300.

The rendering formula generating unit 220 generates a rendering formula K(T=T') by assigning, to the executable area formula $\Phi(P, L, T)$, an actual value T' of an external variable T included in the performance data P(t) (hereinafter, an actual value of an external variable T may also be referred to as an "external variable value"). That is, the rendering formula K(T=T') is equivalent to the executable area formula $\Phi(P, L, T=T')$ (K(T=T')=$\Phi(P, L, T=T')$).

The executable area rendering unit 230 renders the executable area R(T=T') using the rendering formula K(T=T') generated by the rendering formula generating unit 220. In a coordinate system in which a vertical axis and a horizontal axis represent the total power consumption P and the total load L respectively, the executable area R(T=T') represents, for example, an extent in which the rendering formula K(T=T') is true.

The actual point rendering unit 240 depicts an actual point Q(t) representing actual values of the total power consumption P and the total load L included in the performance data P(t) acquired by the performance data acquisition unit 210. By the actual point rendering unit 240 rendering the actual point Q(t) on the R(T=T') rendered by the executable area rendering unit 230, the graph at time t (G(t)) will be displayed.

<Details of Processes>

Next, details of processes performed by the operation support system 1 according to the present embodiment will be described.

Figure 5:
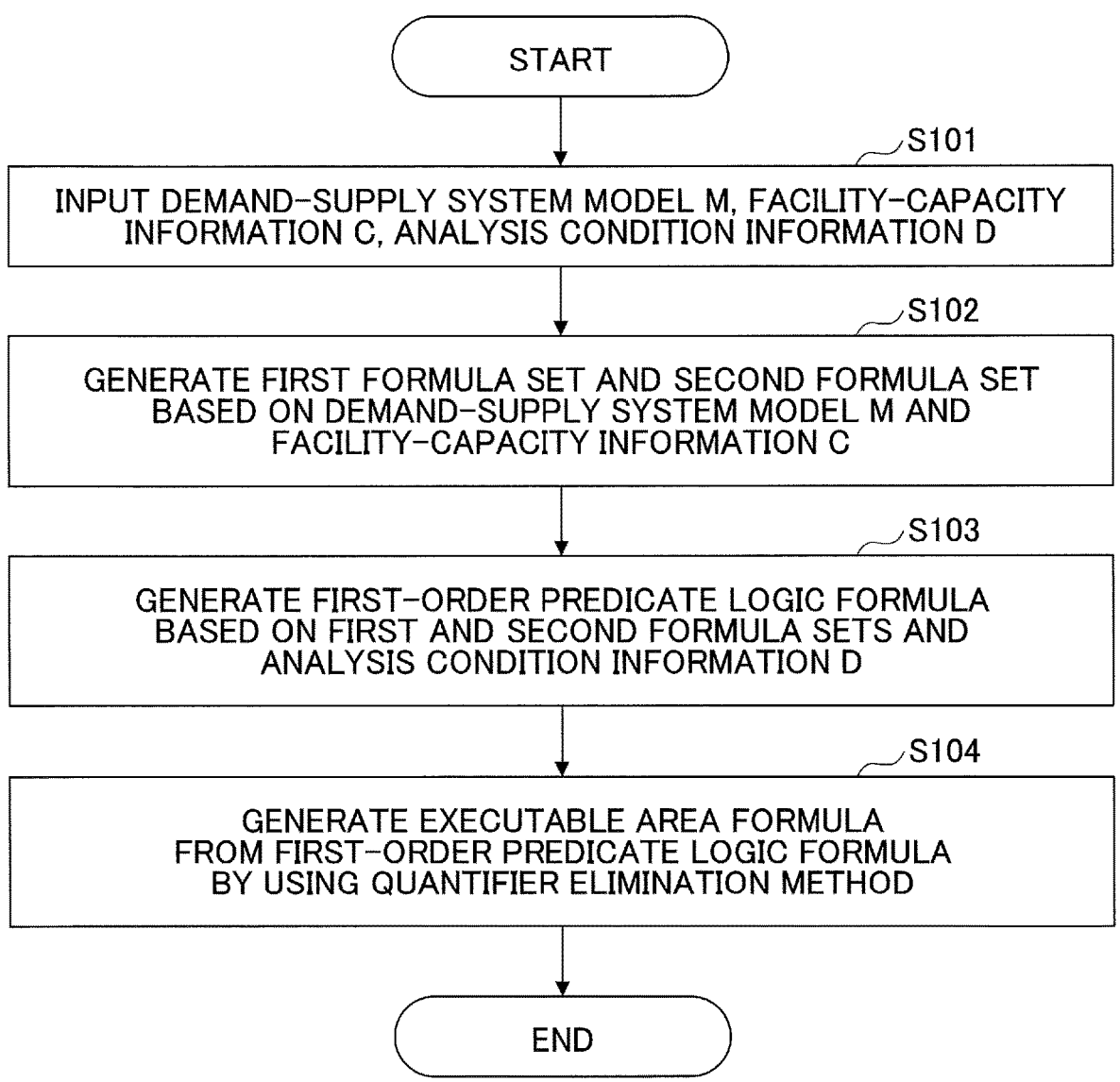
FIG. 5 is a flowchart illustrating an example of a process executed by an offline analyzing unit.

First, a process executed by the offline analyzing unit 100 to generate the executable area formula $\Phi$ will be described with reference to FIG. 5. FIG. 5 is a flowchart illustrating an example of the process executed by the offline analyzing unit 100.

Step S101: First, the demand-supply system model M, the facility-capacity information C, and the analysis condition information D are entered to the input unit 110.

Figure 6:
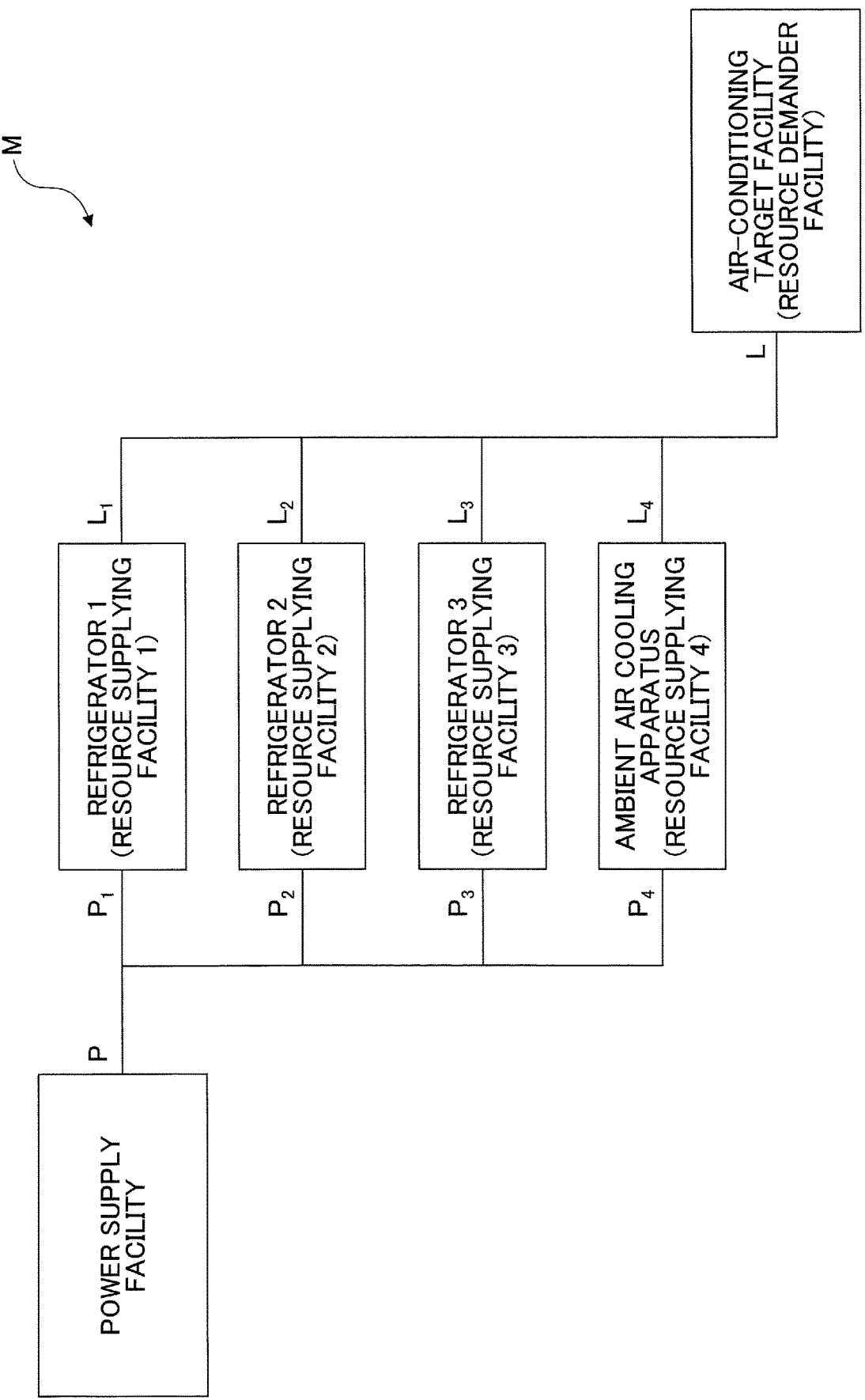
FIG. 6 is a diagram illustrating an example of a demand-supply system model.

Here, specific examples of the demand-supply system model M will be described with reference to FIG. 6. FIG. 6 is a diagram illustrating an example of the demand-supply system model M.

The demand-supply system model M illustrated in FIG. 6 represents a model of an air conditioning system including refrigerators 1, 2, and 3 and an ambient air cooling apparatus each supplying cold energy to an air-conditioning target facility by using electric power supplied from a power supply facility.

The refrigerator 1, included in the demand-supply system model M illustrated in FIG. 6, consumes electric power $P_1$ (kW) against thermal load $L_1$ (kW). Similarly, the refrigerator 2 consumes electric power $P_2$ (kW) against thermal load $L_2$ (kW), and the refrigerator 3 consumes electric power $P_3$ (kW) against thermal load $L_3$ (kW). Also, the ambient air cooling apparatus consumes electric power $P_4$ (kW) against thermal load $L_4$ (kW).

The sum of the electric power $P_1$, $P_2$, $P_3$, $P_4$ consumed by the refrigerators 1 to 3 and the ambient air cooling apparatus corresponds to the total power consumption P (kW) consumed by the entire air conditioning system. Also, the total load L (kW) required by the air-conditioning target facility is divided into the thermal loads $L_1$, $L_2$, $L_3$, $L_4$, which are distributed to the refrigerators 1 to 3 and the ambient air cooling apparatus respectively.

Figure 7:
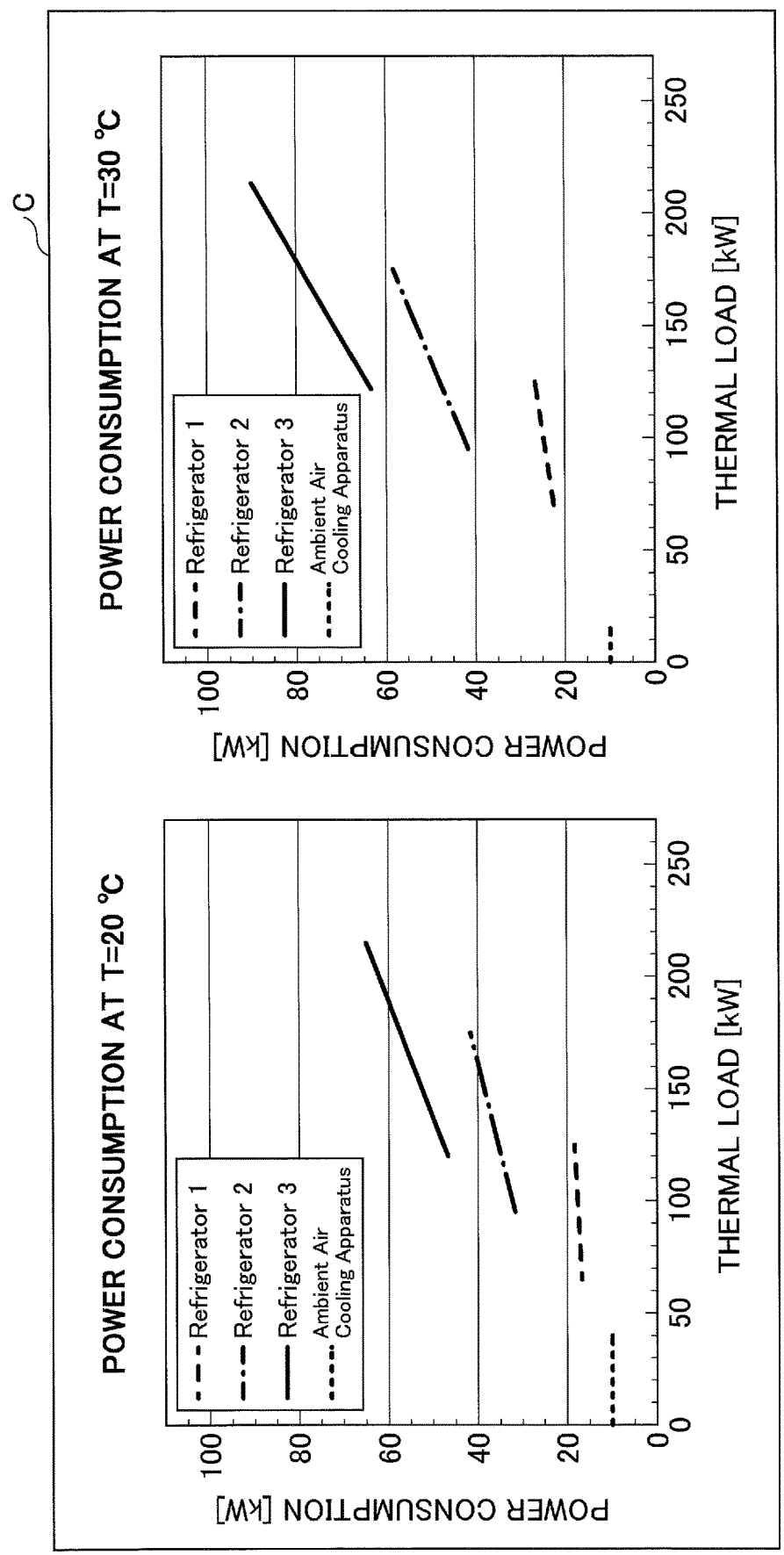
FIG. 7 is a diagram illustrating an example of facility-capacity information.

Next, a specific example of the facility-capacity information C corresponding to the demand-supply system model M illustrated in FIG. 6 will be described with reference to FIG. 7. FIG. 7 is a diagram illustrating an example of the facility-capacity information C.

The facility-capacity information C illustrated in FIG. 7 represents power consumption characteristics for the thermal load of the refrigerators 1 to 3 and the ambient air cooling apparatus. Each of the refrigerators 1 to 3 has a different power consumption characteristic and a different range (restriction) of a lower and upper limit of the thermal load, and power consumption of each of the refrigerators 1 to 3 varies depending on an outside air temperature. The facility-capacity information C illustrated in FIG. 7 represents power consumption characteristics in a case in which an outside air temperature T is 20 degrees Celsius and in a case in which an outside air temperature T is 30 degrees Celsius.

Regarding the ambient air cooling apparatus, though power consumption is constant regardless of variation in an outside air temperature, suppliable cold energy varies depending on an outside air temperature. Especially, suppliable cold energy increases when an outside air temperature is low.

The refrigerators 1 to 3 and the ambient air cooling apparatus can switch between an operating state and a stopped state. In a stopped state, supplied cold energy is 0 kW, and power consumption is also 0 kW.

Next, a specific example of the analysis condition information D will be described with reference to FIG. 8. FIG. 8 is a diagram illustrating an example of the analysis condition information D.

The analysis condition information D defines variables representing a horizontal axis (X-axis) and a vertical axis (Y-axis) of a coordinate system in which the executable area R is rendered, and defines an external variable. In the analysis condition information D illustrated in FIG. 8, a variable "L" representing a total load is defined as a variable of the horizontal axis (X-axis), and a variable "P" representing total power consumption is defined as a variable of the vertical axis (Y-axis). Further, as an external variable, a variable "T" representing an outside air temperature is defined.

Note that the demand-supply system model M, the facility-capacity information C, and the analysis condition information D are stored in the storage device 18 of the analysis apparatus 10, for example. However, the demand-supply system model M, the facility-capacity information C, and the analysis condition information D may be stored in the recording medium 13a or the like. The demand-supply system model M, the facility-capacity information C, and the analysis condition information D are created by a user through the input device 11.

Alternatively, the demand-supply system model M, the facility-capacity information C, and the analysis condition information D may be obtained from another apparatus via the communication I/F 14.

In the example illustrated in FIG. 8, although the variable of the X-axis and the variable of the Y-axis are defined in the analysis condition information D, what is defined in the analysis condition information D is not limited to the above variables. For example, a variable of a Z-axis may further be defined in the analysis condition information D. More generally, any number of variables may be defined in the analysis condition information D.

Step S102: The formula generating unit 120 generates a first formula set and a second formula set based on the demand-supply system model M and the facility-capacity information C entered to the input unit 110.

Figure 10:
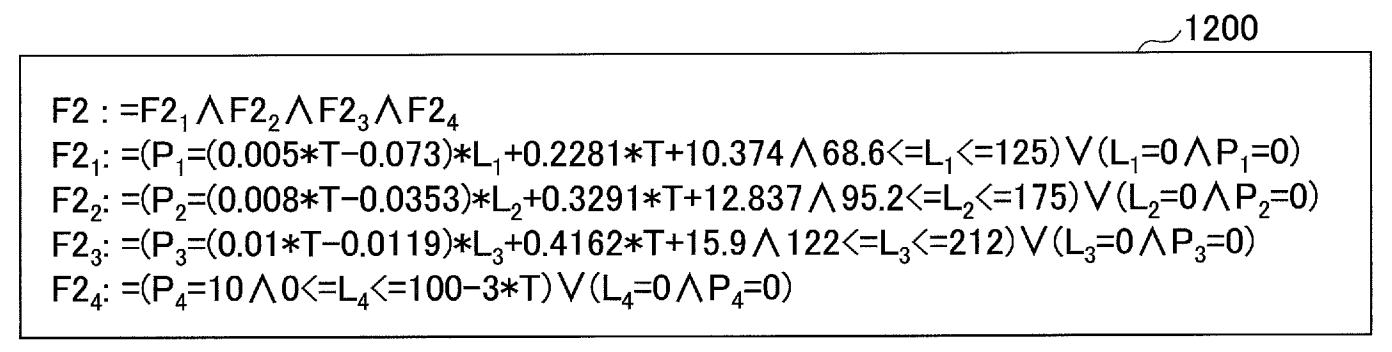

Specifically, the formula generating unit 120 generates a first formula set 1100 illustrated in FIG. 9 and a second formula set 1200 illustrated in FIG. 10, based on the demand-supply system model M illustrated in FIG. 6 and the facility-capacity information C illustrated in FIG. 8.

That is, "F1" in the first formula set 1100 illustrated in FIG. 9 is generated by connecting a formula "P=$P_1+P_2+P_3+P_4$" and a formula "L=$L_1+L_2+L_3+L_4$" with an AND ($\wedge$) operator. Note that the formula "P=$P_1+P_2+P_3+P_4$" represents that a sum of power consumption of the refrigerators 1 to 3 and the ambient air cooling apparatus ($P_1+P_2+P_3+P_4$) is the total power consumption P, and the formula "L=$L_1+L_2+L_3+L_4$" represents that the total load L required by the air-conditioning target facility is distributed to the thermal loads of the refrigerators 1 to 3 ($L_1$, $L_2$, and $L_3$) and the thermal load of the ambient air cooling apparatus ($L_4$).

Also, "F2" in the second formula set 1200 illustrated in FIG. 10 is generated by connecting formulas $F2_1$, $F2_2$, $F2_3$, and $F2_4$ with an AND (A) operator. Note that the formulas $F2_1$, $F2_2$, and $F2_3$ respectively represent characteristics of the refrigerators 1, 2, and 3, and $F2_4$ represents a characteristic of the ambient air cooling apparatus.

Also, note that $F2_1$ is generated by connecting a logical formula "$P_1$=(0.005×T−0.073)×$L_1$+0.2281×T+10.374" representing a characteristic of power consumption $P_1$ of the refrigerator 1 to an outside air temperature T and thermal load $L_1$, and a range of thermal load $L_1$ (68.6≤$L_1$≤125) suppliable by the refrigerator 1, with an AND ($\wedge$) operator, and by connecting the above generated logical formula and another logical formula ($L_1$=0 $\wedge P_1$=0) representing that the thermal load $L_1$ during a stopped state is zero, with an OR ($\vee$) operator. $F2_2$ and $F2_3$ are also generated in a similar way.

$F2_4$ is generated by connecting a logical formula "$P_4$=10" representing that power consumption $P_4$ of the ambient air cooling apparatus is 10 and a formula (0≤$L_4$≤100−3× T) representing a suppliable range of thermal load $L_4$ (which varies depending on an outside air temperature T), with an AND ($\wedge$) operator, and by connecting the above generated logical formula and another logical formula ($L_4$=0 $\wedge P_4$=0) representing that the thermal load $L_4$ during a stopped state is zero, with an OR ($\vee$) operator.

Note that the above second formula set 1200 represents a case in which $P_1$, $P_2$, $P_3$, and $P_4$ (the power consumption of the refrigerators 1, 2, and 3, and the power consumption of the ambient air cooling apparatus) are all zero (kW), when the refrigerators 1, 2, and 3, and the ambient air cooling apparatus are in stopped states.

Step S103: The first-order predicate logic formula generating unit 130 generates a first-order predicate logic formula, based on the first formula set and the second formula set generated by the formula generating unit 120.

For example, the first-order predicate logic formula generating unit 130 generates the following first-order predicate logic formula H (formula (1)), based on the first formula set 1100 illustrated in FIG. 9, the second formula set 1200 illustrated in FIG. 10, and the analysis condition information D illustrated in FIG. 8.

$$H := \exists L_1 \exists L_2 \exists L_3 \exists L_4 \exists P_1 \exists P_2 \exists P_3 \exists P_4 (F1 \wedge F2) \qquad (1)$$

The first-order predicate logic formula H illustrated in the above formula (1) is generated in the following sequence: First, a logical formula is made by connecting the F1 in the first formula set 1100 illustrated in FIG. 9 and the F2 in the second formula set 1200 illustrated in FIG. 10 with an AND ($\wedge$) operator. Second, quantifiers corresponding to all variables (except the total load L, the total power consumption P, and the outside air temperature T) are generated. Each quantifier is made by attaching existential quantifier $\exists$ to each variable. Lastly, the first-order predicate logic formula H is generated by attaching the quantifiers to the logical formula.

An example of the first-order predicate logic formula H, in which the first formula set 1100 illustrated in FIG. 9 and the second formula set 1200 illustrated in FIG. 10 are substituted into the first-order predicate logic formula H illustrated in formula (1), is illustrated in the following formula (formula (2)).

$$\begin{aligned} H := \quad & (2) \\ \exists L_1 \exists L_2 \exists L_3 \exists L_4 \exists P_1 \exists P_2 \exists P_3 \exists P_4 (P = P_1 + P_2 + P_3 + P_4 \wedge L = \\ & L_1 + L_2 + L_3 + L_4 \wedge \\ & (P_1 = (0.005 * T - 0.073) * L_1 + \\ & 0.2281 * T + 10.374 \wedge 68.6 <= \\ & L_1 <= 125) \vee (L_1 = 0 \wedge P_1 = 0) \wedge \\ & (P_2 = (0.008 * T - 0.0353) * L_2 + \\ & 0.3291 * T + 12.837 \wedge 95.2 <= \\ & L_2 <= 175) \vee (L_2 = 0 \wedge P_2 = 0) \wedge \\ & (P_3 = (0.01 * T - 0.0119) * L_3 + \\ & 0.4162 * T + 15.9 \wedge 122 <= L_3 <= \\ & 212) \vee (L_3 = 0 \wedge P_3 = 0) \wedge (P_4 = \\ & 10 \wedge 0 <= L_4 <= 100 - 3 * T) \vee \\ & (L_4 = 0 \wedge P_4 = 0)) \end{aligned}$$

Step S104: The quantifier eliminating unit 140 generates the executable area formula Φ(P, L, T) by using a quantifier elimination method, based on the first-order predicate logic formula generated by the first-order predicate logic formula generating unit 130, and on the analysis condition information D entered to the input unit 110.

For example, the quantifier eliminating unit 140 generates the executable area formula Φ(P, L, T) based on the first-order predicate logic formula H illustrated in formula (2). The executable area formula Φ(P, L, T) is a logical formula representing a relation among the variable "total power consumption P" corresponding to a vertical axis, the variable "total load L" corresponding to a horizontal axis, and the external variable T. For example, the quantifier eliminating unit 140 can generate the executable area formula Φ by using a method disclosed in Japanese Patent No. 5761476.

As described above, according to the operation support system 1 of the present embodiment, the analysis apparatus 10 generates the executable area formula Φ which is a logical formula representing a relation among variables defined in the analysis condition information D (that is, a variable corresponding to a vertical axis, a variable corresponding to a horizontal axis, and an external variable).

Figure 11:
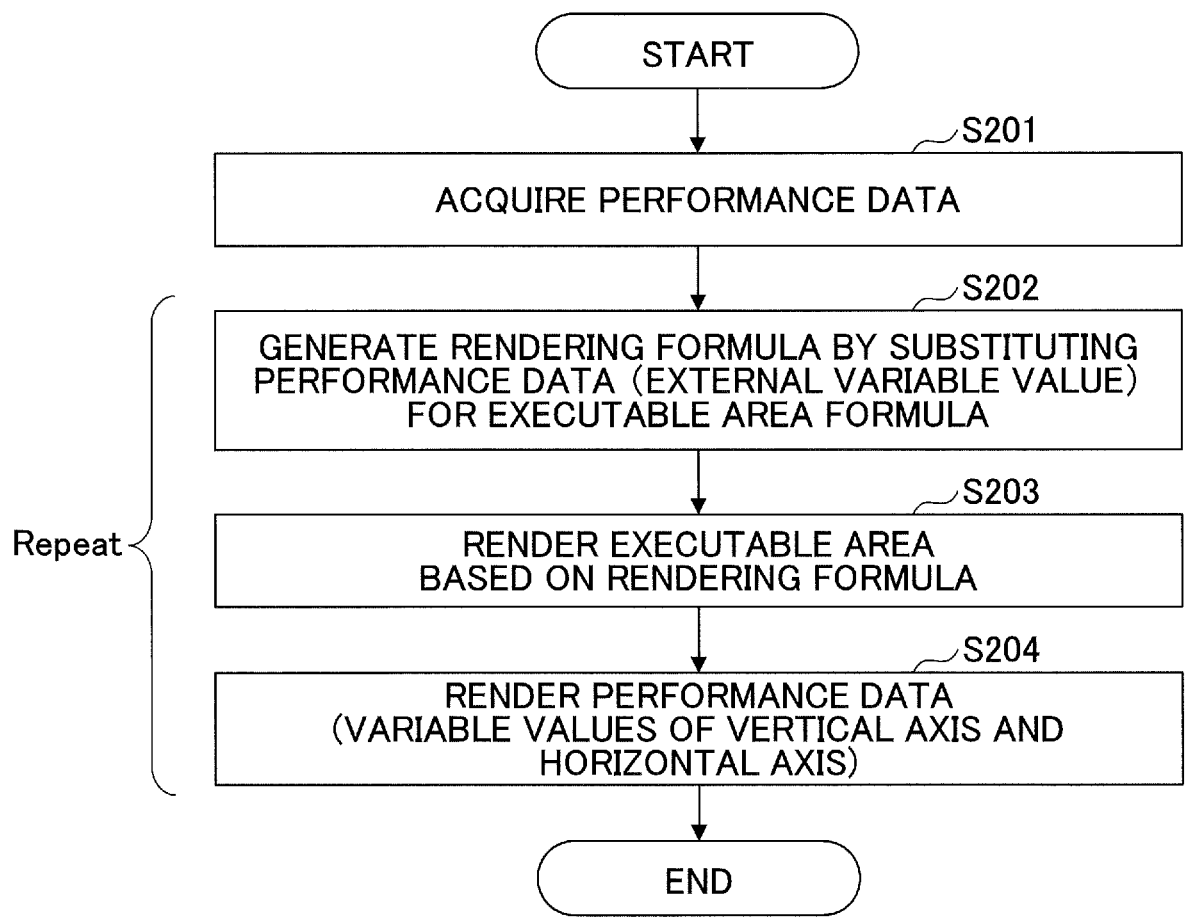
FIG. 11 is a flowchart illustrating an example of a process executed by an online visualizing unit.

Next, a process executed by the online visualizing unit 200 to display the graph G by rendering the executable area R and the actual point Q will be described with reference to FIG. 11. FIG. 11 is a flowchart illustrating an example of the process executed by the online visualizing unit 200.

Step S201: The performance data acquisition unit 210 acquires performance data P(t) at time t from the measurement apparatus 30. The performance data P(t) at time t is generated by the performance measuring unit 300 in the measurement apparatus 30 measuring the demand-supply system. Note that the performance data P(t) includes an actual value of the total power consumption P at time t, an actual value of the total load L at time t, and an external variable value T (=T') at time t.

Step S202: The rendering formula generating unit 220 generates a rendering formula K(T=T') by assigning, to the executable area formula Φ(P, L, T), the external variable value T' included in the performance data P(t).

Step S203: The executable area rendering unit 230 renders the executable area R(T=T') using the rendering formula K(T=T') generated by the rendering formula generating unit 220. For example, by rendering an extent in which the rendering formula K(T=T') is true in the coordinate system in which a vertical axis and a horizontal axis are the total power consumption P and the total load L respectively, the executable area rendering unit 230 renders the executable area R(T=T').

Step S204: The actual point rendering unit 240 renders an actual point Q(t) representing actual values of the total power consumption P and the total load L included in the performance data P(t) acquired by the performance data acquisition unit 210.

The above mentioned steps from Step S202 to Step S204 are executed repeatedly every time the performance data acquisition unit 210 acquires performance data P(t). Accordingly, in the operation support system 1 of the present embodiment, the support apparatus 20 displays the graph G including the executable area R rendered dynamically in accordance with the external variable value included in the performance data, and including the actual point Q.

Figure 12A:
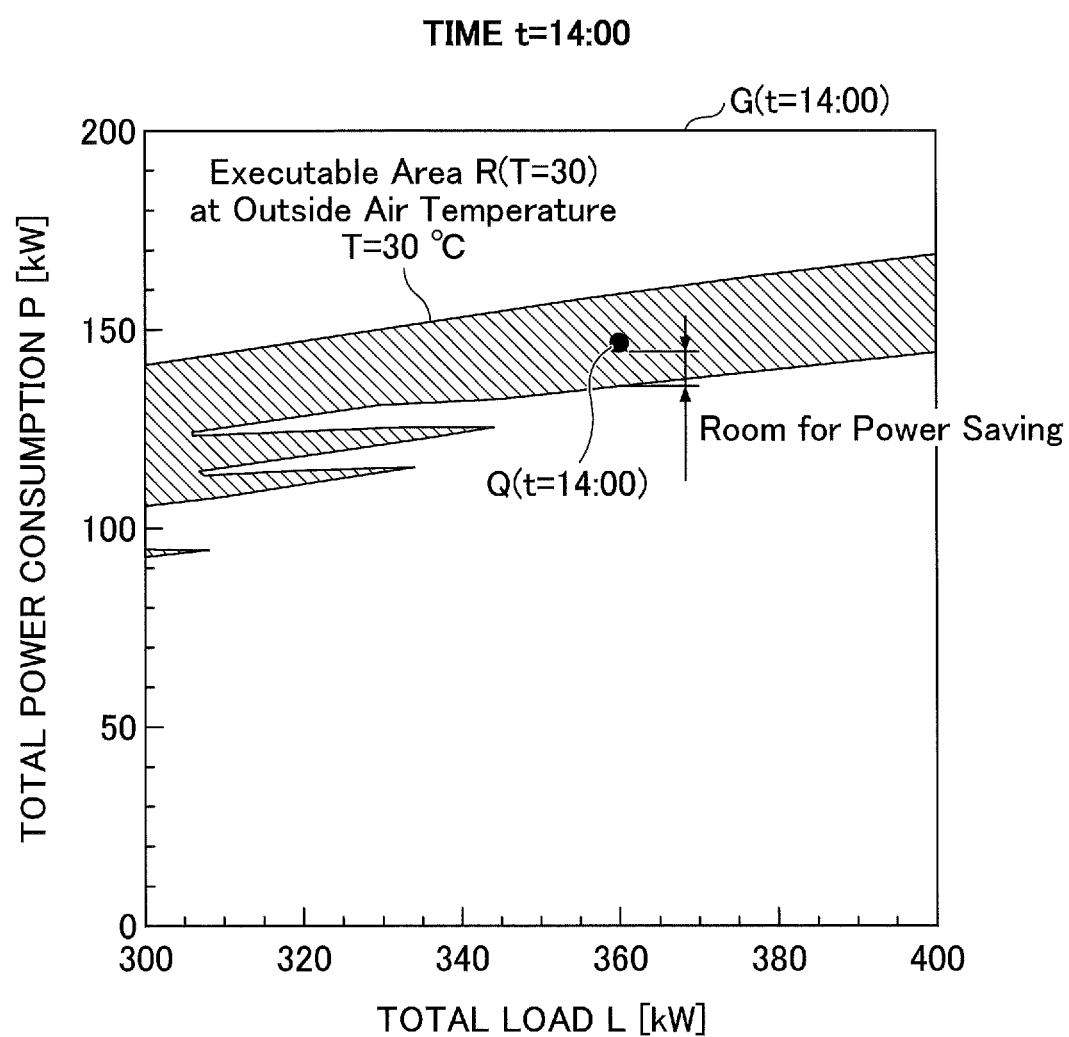
FIG. 12A and FIG. 12B are examples of a graph.

Examples of the graph G(t) are described with reference to FIGS. 12A and 12B. FIG. 12A illustrates a graph G(t=14:00) at a time t=14:00 and at the external variable value T=30 degrees Celsius, and FIG. 12B illustrates a graph G(t=15:00) at a time t=15:00 and at the external variable value T=20 degrees Celsius.

As illustrated in FIG. 12A, the graph G(t=14:00) includes an executable area R(T=30) when the external variable value T is 30 degrees Celsius, and an actual point Q(t=14:00) when time t is 14:00. Accordingly, by comparing the actual point Q(t=14:00) with a minimum value of the executable area R(T=30), a user, such as a person in charge, can make an investigation of the demand-supply system, as to whether there is room for power saving in the demand-supply system.

Figure 12B:
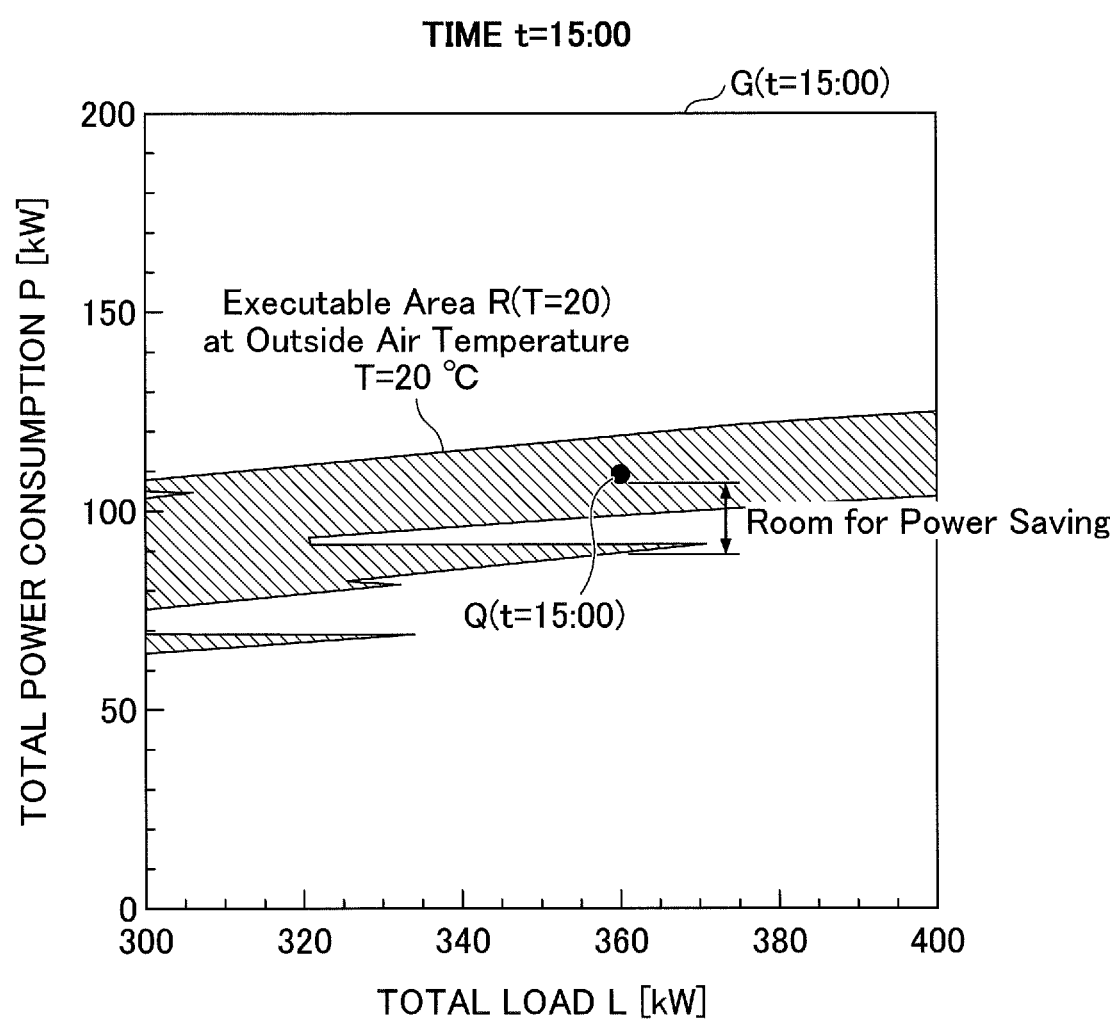

Similarly, as illustrated in FIG. 12B, the graph G(t=15:00) includes an executable area R(T=20) when the external variable value T is 20 degrees Celsius, and an actual point Q(t=15:00) when time t is 15:00. Accordingly, by comparing the actual point Q(t=15:00) with a minimum value of the executable area R(T=20), a user, such as a person in charge, can make an investigation of the demand-supply system, as to whether there is room for power saving in the demand-supply system.

As described above, by rendering the executable area R(T=T') dynamically in accordance with the external variable value T' included in the performance data P(t), the graph G(t) including the executable area R(T=T') reflecting an actual operating status of the demand-supply system can be displayed. Accordingly, a user, such as a person in charge, can accurately judge whether or not an efficiency of the demand-supply system can be improved.

Further, according to the operation support system 1 of the present embodiment, processes performed until the executable area formula Φ is generated are executed offline in the analysis apparatus 10. Therefore, the support apparatus 20 according to the present embodiment can quickly display a graph G online.

Figure 13:
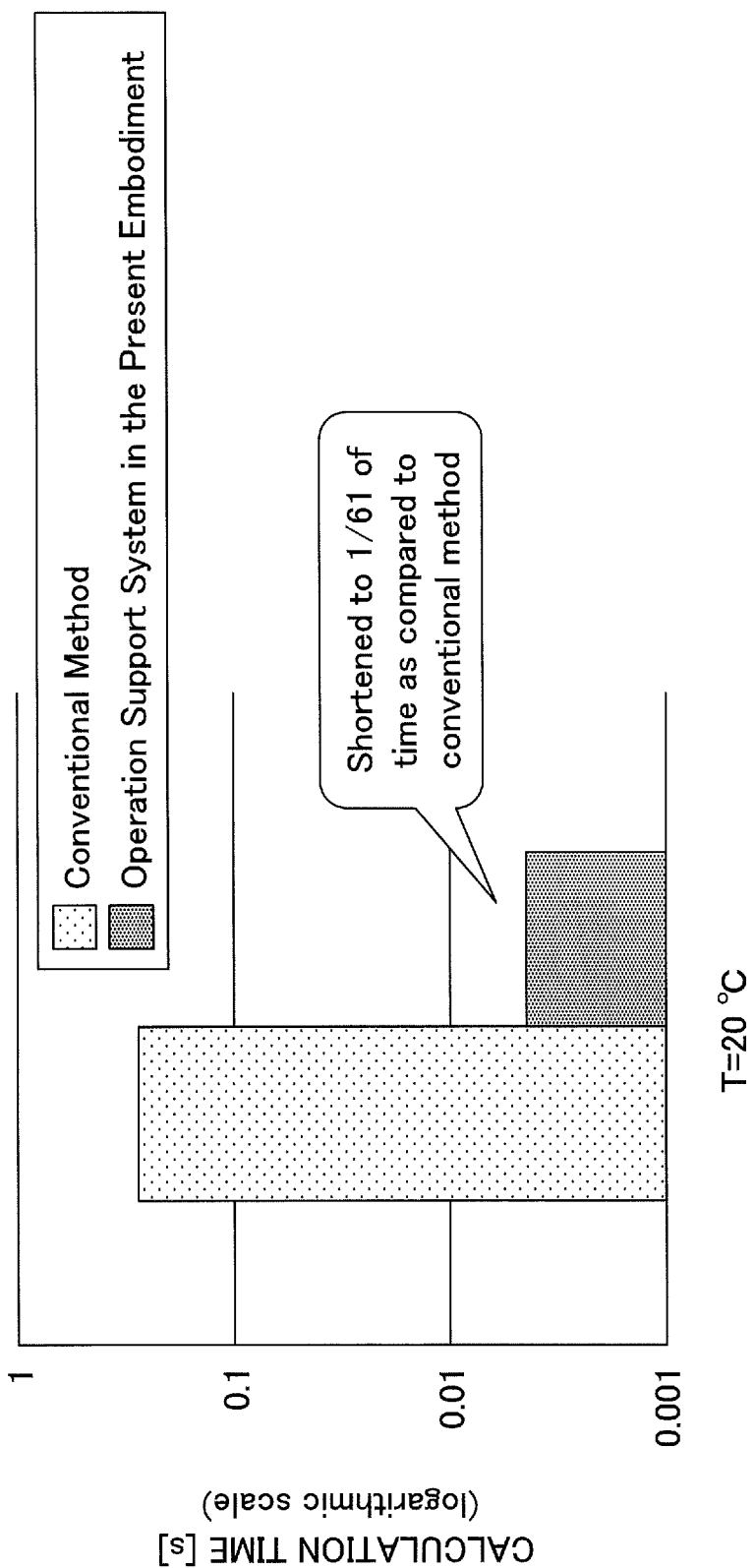
FIG. 13 illustrates the comparison result of a calculation time.

Lastly, the following describes a comparison result of calculation time required for generating a rendering formula K, in the operation support system 1 of the present embodiment and in the method disclosed in Japanese Patent No. 6065167, in a case in which the demand-supply system model M illustrated in FIG. 6 is used. FIG. 13 illustrates the comparison result of the calculation time.

As illustrated in FIG. 13, the operation support system 1 of the present embodiment can generate the rendering formula K in approximately 1/61 of time as compared to the method disclosed in Japanese Patent No. 6065167. As described above, in the operation support system 1 according to the present embodiment, the rendering formula K can be quickly generated online, and thereby the executable area R can be rendered quickly. Generally, calculating time required for generating a rendering formula K exponentially increases in accordance with increase of the number of facilities included in the demand-supply system. Therefore, in comparison with a conventional method, the operation support system 1 according to the present embodiment can reduce calculation time more significantly as the number of facilities in the demand-supply system increases.

The present invention is not limited to the above specifically described embodiment, but various variations and enhancements can be made without departing from the scope of the claims.

What is claimed is:

1. An operation support system for supporting an operation of a demand-supply system, the demand-supply system including a plurality of resource supplying facilities each configured to supply a resource, a resource demander facility configured to demand the resource supplied from each resource supplying facility, and a measurement apparatus configured to measure performance data of the demand-supply system, the operation support system comprising a processor, and a memory storing a computer program that causes the processor to perform processes including:
 a) receiving an input of a demand-supply system model of the demand-supply system, facility-capacity information representing a facility capacity of each resource supplying facility, and analysis condition information defining a plurality of variables to be analyzed with respect to the demand-supply system model and the facility-capacity information and defining an external variable, the external variable representing an external condition of the demand-supply system model;
 b) generating a correlation logical formula representing a relation among the plurality of variables and the external variable, based on the demand-supply system model, the facility-capacity information, and the analysis condition information received in step a);
 c) after step b), acquiring performance data from the measurement apparatus during an operation of the demand-supply system, the performance data including first actual values of the plurality of variables and a second actual value of the external variable;
 d) substituting the acquired second actual value into the correlation logical formula to render an area indicating a possible range of the facility capacity under a condition in which the external variable is the second actual value, and rendering a measurement point for indicating the acquired first actual values;
 and e) repeating step c) and step d) every time a performance data acquisition unit of the operation support system acquires performance data, wherein step a) and step b) are performed offline by an offline analyzing unit of the operation support system, and step d) is performed online, in response to acquiring the performance data from the measurement apparatus in step c), wherein the demand-supply system model is a model of an air conditioning system, the air conditioning system including a first heat source facility configured to produce first cold energy by consuming power supplied from a power supply facility and to supply the produced first cold energy to an air-conditioning target facility, the first cold energy being the resource, a second heat source facility configured to produce second cold energy by consuming the power supplied from the power supply facility and to supply the produced second cold energy to the air-conditioning target facility, the second cold energy being the resource, and the supplied second cold energy varying with an outside air temperature, and the outside air temperature being indicated by the external variable, the air-conditioning target facility configured to consume cold energy from the first cold energy and the second cold energy, and a path disposed between each of the first heat source facility and the second heat source facility and the air-conditioning target facility, the path being for supplying, to the air-conditioning target facility, cold energy among the first cold energy and the second cold energy from the first heat source facility and the second heat source facility, wherein the plurality of resource supplying facilities include the first heat source facility and the second heat source facility, wherein the resource demander facility is the air-conditioning target facility, wherein each of the first heat source facility and the second heat source facility consumes the power supplied from the power supply facility, in accordance with a thermal load assigned to a corresponding heat source facility, wherein a total thermal load required by the air-conditioning target facility is obtained from thermal loads assigned to the first heat source facility and second heat source facility, wherein the facility-capacity information indicates an actually consumed power characteristic by each of the first heat source facility and second heat source facility, the actually consumed power characteristic corresponding to the thermal load assigned to a corresponding heat source facility, wherein the plurality of variables to be analyzed includes a total thermal load assigned to the first heat source facility and second heat source facility, and an actually consumed total power by the first heat source facility and second heat source facility, and wherein in step d), the substituting of the acquired second actual value into the correlation logical formula includes rendering, based on coordinates, the possible range within which, at the outside air temperature indicated by the second actual value, (i) the total thermal load is required by the first heat source facility and second heat source facility and (ii) the total power is actually consumed by the first heat source facility and second heat source facility, and the rendering of the measurement point for indicating the acquired first actual values includes rendering, at the outside air temperature indicated by the second actual value, the required total thermal load and actually consumed total power, by the first heat source facility and second heat source facility, that are respectively indicated by the first actual values, thereby setting the rendered total thermal load and total power consumption, at the measurement point that is in association with the coordinates in the rendered possible range, the measurement point being displayed as a visually identifiable isolated point, wherein the set total thermal load and total power consumption at the measurement point are respectively indicated by actual measured values by the measurement apparatus, the actual measured values being acquired upon occurrence of a condition in which the first heat source facility and second heat source facility are operating at the outside air temperature indicated by the second actual value, wherein in step d), the possible range includes a lower limit of the total power consumption for the total thermal load, the lower limit being predicted by substituting the outside air temperature into the correlation logical formula, and the measurement point being configured to be compared with the lower limit of the possible range, wherein step b) includes generating a first formula set by combining a first formula, describing that a sum of power consumption of the first heat source facility and the second heat source facility is the total power consumption, and a second formula describing that a total load required by the air-conditioning target facility is distributed to the thermal loads of the first heat source facility and the second heat source facility, generating a second formula set by combining a first characterization formula describing a characteristic of the first heat source facility and a second characterization formula describing a characteristic of the first heat source facility, wherein the first characteristic formula is generated based on (i) a characteristic of the power consumption of the first heat source facility in accordance with the outside air temperature and a corresponding thermal load of the first heat source facility and (ii) a range of the thermal load suppliable by the first heat source facility, and the second characteristic formula is generated based on (i) the power consumption of the second heat source facility and (ii) a range of the thermal load suppliable by the second heat source facility in accordance with the outside air temperature, generating first-order predicate logic by combining the first formula set and the second formula set, the first-order predicate logic representing quantifiers corresponding to all variables except the total thermal load, the total power consumption, and the outside air temperature, and using quantifier elimination to generate the correlation logical formula based on the first-order predicate logic and the analysis condition information, the correlation logical formula logically describing (i) the respective variables of the total thermal load and the total power consumption, for the first heat source facility and the second heat source facility, and (ii) the external variable of the outside air temperature, and wherein in step d), the rendering of the area indicating the possible range of the facility capacity includes assigning, to the correlation logical formula, the outside air temperature indicated by the second actual value, thereby rendering, with respect to the outside air temperature assigned to the correlation logical formula, the possible range of the total thermal load and the total power consumption for the first heat source facility and the second heat source facility.

2. The operation support system according to claim 1, wherein the generating of the correlation logical formula includes
generating a formula set including a plurality of formulas that represent a target variable and a constraint condition of the demand-supply system, based on the demand-supply system model, the facility-capacity information, and the analysis condition information,
generating the first-order predicate logic based on the generated formula set, and
generating the correlation logical formula representing the relation among the plurality of variables and the external variable, based on the generated first-order predicate logic by using the quantifier elimination.

3. The operation support system according to claim 1, wherein the rendering includes generating a rendering formula by assigning, to the correlation logical formula, the second actual value of the external variable included in the performance data, and rendering the area by rendering an extent in which the rendering formula is true, in a coordinate system in which each coordinate axis corresponds to one of the plurality of variables.

4. An operation support method performed by a computer configured to support an operation of a demand-supply system, the demand-supply system including a resource supplying facility configured to supply a resource, a resource demander facility configured to demand the resource supplied from the resource supplying facility, and a measurement apparatus configured to measure performance data of the demand-supply system, the method comprising:
a) receiving an input of a demand-supply system model of the demand-supply system, facility-capacity information representing a facility capacity of the resource supplying facility, and analysis condition information defining a plurality of variables to be analyzed with respect to the demand-supply system model and the facility-capacity information and defining an external variable, the external variable representing an external condition of the demand-supply system model;
b) generating a correlation logical formula representing a relation among the plurality of variables and the external variable, based on the demand-supply system model, the facility-capacity information, and the analysis condition information;
c) after step b), acquiring performance data from the measurement apparatus during an operation of the demand-supply system, the performance data including first actual values of the plurality of variables and a second actual value of the external variable;
d) substituting the acquired second actual value into the correlation logical formula to render an area indicating a possible range of the facility capacity under a condition in which the external variable is the second actual value, and rendering a measurement point for indicating the acquired first actual values;
and e) repeating step c) and step d) every time a performance data acquisition unit of the operation support system acquires performance data, wherein step a) and step b) are performed by an offline analyzing unit of the operation support system, and step d) is performed online, in response to acquiring the performance data from the measurement apparatus in step c), wherein the demand-supply system model is a model of an air conditioning system, the air conditioning system including a first heat source facility configured to produce first cold energy by consuming power supplied from a power supply facility and to supply the produced first cold energy to an air-conditioning target facility, the first cold energy being the resource, a second heat source facility configured to produce second cold energy by consuming the power supplied from the power supply facility and to supply the produced second cold energy to the air-conditioning target facility, the second cold energy being the resource, and the supplied second cold energy varying with an outside air temperature, and the outside air temperature being indicated by the external variable, the air-conditioning target facility configured to consume cold energy from the first cold energy and the second cold energy, and a path disposed between each of the first heat source facility and the second heat source facility and the air-conditioning target facility, the path being for supplying, to the air-conditioning target facility, cold energy among the first cold energy and the second cold energy from the first heat source facility and the second heat source facility, wherein the plurality of resource supplying facilities include the first heat source facility and the second heat source facility, wherein the resource demander facility is the air-conditioning target facility, wherein each of the first heat source facility and the second heat source facility consumes the power supplied from the power supply facility, in accordance with thermal load assigned to a corresponding heat source facility, wherein a total thermal load required by the air-conditioning target facility is obtained from thermal loads assigned to the first heat source facility and second heat source facility, wherein the facility-capacity information indicates an actually consumed power characteristic by each of the first heat source facility and second heat source facility, the actually consumed power characteristic corresponding to the thermal load assigned to a corresponding heat source facility, wherein the plurality of variables to be analyzed includes a total thermal load assigned to the first heat source facility and second heat source facility, and an actually consumed total power by the first heat source facility and second heat source facility, and wherein in step d), the substituting of the acquired second actual value into the correlation logical formula includes rendering, based on coordinates, the possible range within which, at the outside air temperature indicated by the second actual value, (i) the total thermal load is required by the first heat source facility and second heat source facility and (ii) the total power is actually consumed by the first heat source facility and second heat source facility, and the rendering of the measurement point for indicating the acquired first actual values includes rendering, at the outside air temperature indicated by the second actual value, the required total thermal load and actually consumed total power, by the first heat source facility and second heat source facility, that are respectively indicated by the first actual values, thereby setting the rendered total thermal load and total power consumption, at the measurement point that is in association with the coordinates in the rendered possible range, the measurement point being displayed as a visually identifiable isolated point, wherein the set total thermal load and total power consumption at the measurement point are respectively indicated by actual measured values by the measurement apparatus, the actual measured values being acquired upon occurrence of a condition in which the first heat source facility and second heat source facility are operating at the outside air temperature indicated by the second actual value, wherein in step d), the possible range includes a lower limit of the total power for the total thermal load, the lower limit being predicted by substituting the outside air temperature into the correlation logical formula, and the measurement point being configured to be compared with the lower limit of the possible range, wherein step b) includes generating a first formula set by combining a first formula, describing that a sum of power consumption of the first heat source facility and the second heat source facility is the total power consumption, and a second formula describing that a total load required by the air-conditioning target facility is distributed to the thermal loads of the first heat source facility and the second heat source facility, generating a second formula set by combining a first characterization formula describing a characteristic of the first heat source facility and a second characterization formula describing a characteristic of the first heat source facility, wherein the first characteristic formula is generated based on (i) a characteristic of the power consumption of the first heat source facility in accordance with the outside air temperature and a corresponding thermal load of the first heat source facility and (ii) a range of the thermal load suppliable by the first heat source facility, and the second characteristic formula is generated based on (i) the power consumption of the second heat source facility and (ii) a range of the thermal load suppliable by the second heat source facility in accordance with the outside air temperature, generating first-order predicate logic by combining the first formula set and the second formula set, the first-order predicate logic representing quantifiers corresponding to all variables except the total thermal load, the total power consumption, and the outside air temperature, and using quantifier elimination to generate the correlation logical formula based on the first-order predicate logic and the analysis condition information, the correlation logical formula logically describing (i) the respective variables of the total thermal load and the total power consumption, for the first heat source facility and the second heat source facility, and (ii) the external variable of the outside air temperature, and wherein in step d), the rendering of the area indicating the possible range of the facility capacity includes assigning, to the correlation logical formula, the outside air temperature indicated by the second actual value, thereby rendering, with respect to the outside air temperature assigned to the correlation logical formula, the possible range of the total thermal load and the total power consumption for the first heat source facility and the second heat source facility.

5. A non-transitory recording medium storing a computer program to cause a computer to perform a method for supporting an operation of a demand-supply system, the demand-supply system including a resource supplying facility configured to supply a resource, and a resource demander facility configured to demand the resource supplied from the resource supplying facility, and a measurement apparatus configured to measure performance data of the demand-supply system, the method comprising:
   a) receiving an input of a demand-supply system model of the demand-supply system, facility-capacity information representing a facility capacity of the resource supplying facility, and analysis condition information defining a plurality of variables to be analyzed with respect to the demand-supply system model and the facility-capacity information and defining an external variable, the external variable representing an external condition of the demand-supply system model;
   b) generating a correlation logical formula representing a relation among the plurality of variables and the external variable, based on the demand-supply system model, the facility-capacity information, and the analysis condition information;
   c) after step b), acquiring performance data from the measurement apparatus during an operation of the demand-supply system, the performance data including first actual values of the plurality of variables and a second actual value of the external variable;
   d) substituting the acquired second actual value into the correlation logical formula to render an area indicating a possible range of the facility capacity under a condition in which the external variable is the second actual value, and rendering a measurement point for indicating the acquired first actual values;
   and e) repeating step c) and step d) every time a performance data acquisition unit of the operation support system acquires performance data, wherein step a) and step b) are performed by an offline analyzing unit of the operation support system, and step d) is performed online, in response to acquiring the performance data from the measurement apparatus in step c), wherein the demand-supply system model is a model of an air conditioning system, the air conditioning system including a first heat source facility configured to produce first cold energy by consuming power supplied from a power supply facility and to supply the produced first cold energy to an air-conditioning target facility, the first cold energy being the resource, a second heat source facility configured to produce second cold energy by consuming the power supplied from the power supply facility and to supply the produced second cold energy to the air-conditioning target facility, the second cold energy being the resource, and the supplied second cold energy varying with an outside air temperature, and the outside air temperature being indicated by the external variable, the air-conditioning target facility configured to consume cold energy from the first cold energy and the second cold energy, and a path disposed between each of the first heat source facility and the second heat source facility and the air-conditioning target facility, the path being for supplying, to the air-conditioning target facility, cold energy among the first cold energy and the second cold energy from the first heat source facility and the second heat source facility, wherein the plurality of resource supplying facilities include the first heat source facility and the second heat source facility, wherein the resource demander facility is the air-conditioning target facility, wherein each of the first heat source facility and the second heat source facility consumes the power supplied from the power supply facility, in accordance with thermal load assigned to a corresponding heat source facility, wherein a total thermal load required by the air-conditioning target facility is obtained from thermal loads assigned to the first heat source facility and second heat source facility, wherein the facility-capacity information indicates an actually consumed power characteristic by each of the first heat source facility and second heat source facility, the actually consumed power characteristic corresponding to the thermal load assigned to a corresponding heat source facility, wherein the plurality of variables to be analyzed includes a total thermal load assigned to the first heat source facility and second heat source facility, and an actually consumed total power by the first heat source facility and second heat source facility, and wherein in step d), the substituting of the acquired second actual value into the correlation logical formula includes rendering, based on coordinates, the possible range within which, at the outside air temperature indicated by the second actual value, (i) the total thermal load is required by the first heat source facility and second heat source facility and (ii) the total power is actually consumed by the first heat source facility and second heat source facility, and the rendering of the measurement point for indicating the acquired first actual values includes rendering, at the outside air temperature indicated by the second actual value, the required total thermal load and actually consumed total power, by the first heat source facility and second heat source facility, that are respectively indicated by the first actual values, thereby setting the rendered total thermal load and total power consumption, at the measurement point that is in association with the coordinates in the rendered possible range, the measurement point being displayed as a visually identifiable isolated point, wherein the set total thermal load and total power consumption at the measurement point are respectively indicated by actual measured values by the measurement apparatus, the actual measured values being acquired upon occurrence of a condition in which the first heat source facility and second heat source facility are operating at the outside air temperature indicated by the second actual value, and wherein in step d), the possible range includes a lower limit of the total power for the total thermal load, the lower limit being predicted by substituting the outside air temperature into the correlation logical formula, and the measurement point being configured to be compared with the lower limit of the possible range, wherein step b) includes generating a first formula set by combining a first formula, describing that a sum of power consumption of the first heat source facility and the second heat source facility is the total power consumption, and a second formula describing that a total load required by the air-conditioning target facility is distributed to the thermal loads of the first heat source facility and the second heat source facility, generating a second formula set by combining a first characterization formula describing a characteristic of the first heat source facility and a second characterization formula describing a characteristic of the first heat source facility, wherein the first characteristic formula is generated based on (i) a characteristic of the power consumption of the first heat source facility in accordance with the outside air temperature and a corresponding thermal load of the first heat source facility and (ii) a range of the thermal load suppliable by the first heat source facility, and the second characteristic formula is generated based on (i) the power consumption of the second heat source facility and (ii) a range of the thermal load suppliable by the second heat source facility in accordance with the outside air temperature, generating first-order predicate logic by combining the first formula set and the second formula set, the first-order predicate logic representing quantifiers corresponding to all variables except the total thermal load, the total power consumption, and the outside air temperature, and using quantifier elimination to generate the correlation logical formula based on the first-order predicate logic and the analysis condition information, the correlation logical formula logically describing (i) the respective variables of the total thermal load and the total power consumption, for the first heat source facility and the second heat source facility, and (ii) the external variable of the outside air temperature, and wherein in step d), the rendering of the area indicating the possible range of the facility capacity includes assigning, to the correlation logical formula, the outside air temperature indicated by the second actual value, thereby rendering, with respect to the outside air temperature assigned to the correlation logical formula, the possible range of the total thermal load and the total power consumption for the first heat source facility and the second heat source facility.

6. The operation support system according to claim 1, wherein the possible range and the measurement point, which are associated with the total thermal load and the total power consumption acquired by the performance data, are reconstructed each time a different outside air temperature in the performance data is acquired by the measurement apparatus, and wherein the facility-capacity information associated with the first heat source facility includes, for each of outside air temperatures, a different power consumption characteristic and a different range of an upper and lower limit of the thermal load.

* * * * *